Sept. 25, 1934.   I. W. GLAZNER   1,975,038

CORE

Filed July 18, 1933

WITNESSES

INVENTOR
Isaac W. Glazner
BY
ATTORNEYS

Patented Sept. 25, 1934

1,975,038

UNITED STATES PATENT OFFICE 1,975,038

CORE

Isaac W. Glazner, Brooklyn, N. Y.

Application July 18, 1933, Serial No. 681,012

3 Claims. (Cl. 18—45)

This invention relates to devices for curing, vulcanizing, and repairing tire casings of various sizes, and the invention has especial reference to adjustable cores which are designed and adapted to be used in conjunction with cavity or sectional type molds, for the stated purpose.

One of the objects of the invention is the provision of a core of the indicated character which will be of efficient and substantial design, durable and rugged in construction, to the end that it will be of long life and therefore economically useful.

Another object of the invention is the provision of cores of the indicated character, and means operable exteriorly of the mold for adjusting the sections of the cores simultaneously to suit tire casings of various sizes.

Still another object of the invention is the provision of means for applying pressure in conjunction with cores and the bead mold sections and bead clamps for shaping the beads of the tire casings while being subjected to heat.

With the foregoing and other objects in view, the invention resides in the provision, construction, and operation of parts as hereinafter fully described and claimed, and as illustrated by way of example in the accompanying drawing, in which Figure 1 is a longitudinal section of a core assembly embodying certain features of the invention;

Figure 1:
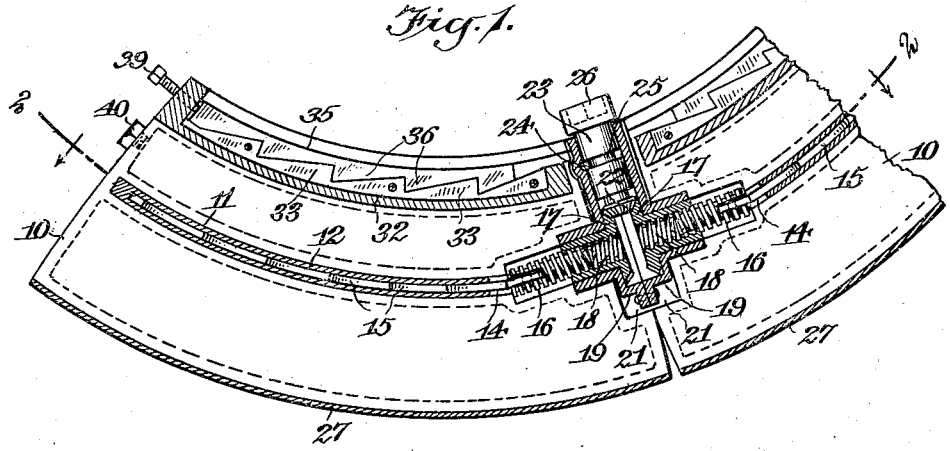
Figure 2:
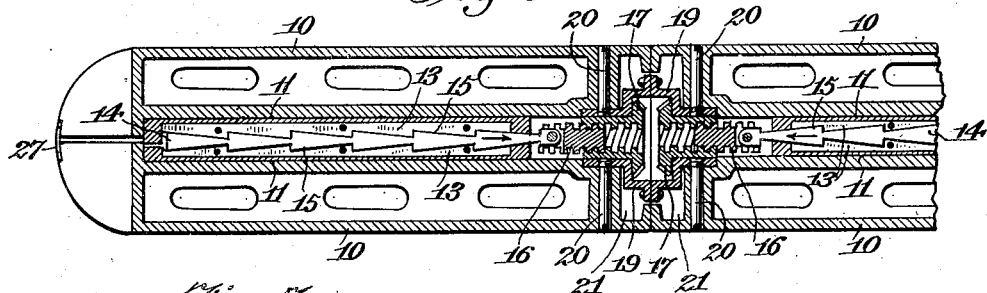
Fig. 2 is a section taken on the line 2—2 of Fig. 1.

Referring now more particularly to Figs. 1 and 2 of the drawing, it will be apparent that there has been shown a core which may be made of a plurality of units to be arranged circumferentially end to end within a tire casing while the latter is arranged within the main exterior cavity mold. Each of the core sections consists of complemental halves or sections 10, which are made of rigid material, preferably metal. The sections 10 are similar in construction and shape and may be solid, or of hollow construction as shown in the present instance. The sections 10 are longitudinally arcuate in formation and in cross section conform generally to the inside shape of a tire casing. The sections 10 are laterally adjustable with respect to each other to suit tire casings of various sizes. Each of the sections 10 has a circumferential or arcuate groove 11 in the inside thereof. The groove 11 in one section 10 will be disposed directly opposite the groove 11 in the other section 10 when the sections are brought together in side-by-side relation. A circumferential or arcuate guide 12 of channel construction extends in the groove 11 of each section 10. A single series of cams 13 is arranged in each of the guides 12. The cams 13 may be formed integral with the guide 12, or may be formed on a single member secured in place in the guide, as shown in the present instance. Use is made of an arcuate member 14 having a double series of cams 15. The member 14 is movable longitudinally in opposite directions and has guided movement in the guides 12 of the sections 10, so that the cams 15 will coact with the cams 13 to cause the relative lateral movement of the sections 10 to adjust the latter according to the size of the tire casing in which they are used. A screw 16 is secured to the member 14 at one end, and this screw is in threading engagement with a bevel gear 17, the latter being threaded, as at 18, for that purpose. The gear 17 is arranged for rotation in a housing coupling member 19 held in place by keys 20, which are disposed transversely through the sections 10, respectively, and said keys 20 being loose in said sections so that the latter may move laterally. The ends of the sections 10 adjacent the gear 17, are provided with recesses 21 to accommodate the members 19.

It will be apparent from the drawing that there has been shown one complete core unit, and only a portion of a second core unit. These core units are similar in the number of parts and construction, except that the screw 16 and gear 17 on one unit is on the right-hand end and that the screw 16 and gear 17 on the other unit is on the left-hand end. The threads of the screw 16 and gear 17 of one unit are opposite to those of the screw 16 and gear 17 of the other unit, so that the gears 17 may be rotated by a common means to cause the members 14 to move simultaneously toward and away from each other, for the purpose of simultaneously effecting the adjustment of the sections 10 of the two core units. The said means consists of a bevel gear 22, which meshes with the gears 17 of the units, and said gear 22 has a hub 23, which extends radially and is supported by the members 19 of the two units. A pin 24 carried by the bushing of one of the units extends in a groove 25 in the hub 22 and prevents axial movement of the gear 22, but allows it to be rotated. The hub 23 has a socket 23 on its outer end to accommodate suitable means for imparting rotational movement to the gear 22. It will now be understood that when the gear 22 is rotated in a counterclockwise direction, the members 14 of the core units will be moved longitudinally toward each other as indicated by the arrows in Fig. 2, thereby causing coaction of the cams 13 and 15, in consequence of which the sections 10 of the core units will be moved laterally away from each other to increase the size of the core units. By rotating the gear 22 in a clockwise direction, the sections 10 of the core units may be moved laterally toward each other to decrease the cross sectional size of the core units, If desired, a cross sectional and longitudinally arcuate strip 27 of metal may be secured to one of the sections 10 to enter a groove in the other section 10, to close the gap between the sections 10 at the bottom thereof.

Figure 3:
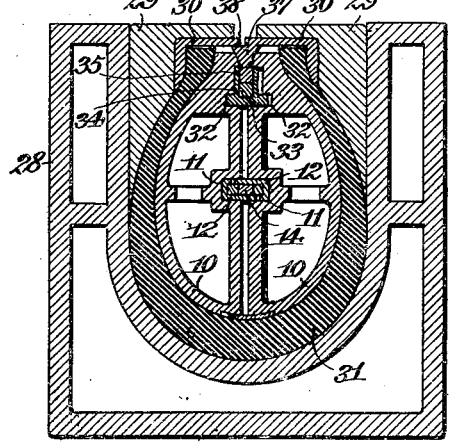
Fig. 3 is a transverse section of a core shown in use in conjunction with a cavity mold and bead clamping and molding means.
Figure 4:
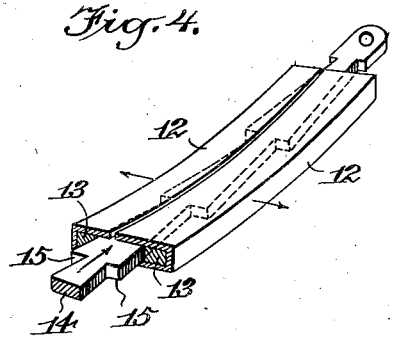
Fig. 4 is a fragmentary perspective view of the means for causing the adjustment of the core sections and for retaining them in the adjusted relation.

It is to be understood that one or a plurality of core units may be used in conjunction with an exterior cavity mold to carry out a vulcanizing operation. In Fig. 3 there is shown a cavity mold 28 of hollow construction which receives the heating medium, such as steam, which is supplied by a steam boiler. The mold 28 also includes bead mold sections 29. In accordance with another feature of the invention use is made of complemental bead clamps 30. It is to be understood that the mold sections 29 and the bead clamps 30 will be longitudinally arcuate. The clamps 30 cooperate with the core sections 10 to shape the beads of the tire casing, and in Fig. 3 a tire casing is designated 31. It is necessary to raise and lower the bead clamps 30 according to the spread of the beads of the tire casing, which occurs by adjusting the sections 10. In order to accomplish the result mentioned, the sections 10 each have a longitudinally arcuate groove 32 to accommodate a correspondingly shaped guide 33. This guide is preferably made fast in the groove 33 in one section 10, and is loose in the groove in the other section 10, so that the sections may move laterally toward and away from each other. A series of cams 34 is arranged within the guide 33 and these cams may be formed integral therewith or formed integral with a member secured in place in the guide 33, as shown. Use is made of a member 35 having cams 36. The member 35 has guided movement in the guide 33, so that its cams 36 will cooperate with the cams 34, for the purpose of retaining the bead clamps 30 in the desired adjusted positions. To this end one of the clamps 30 has a beveled rib 37, which rests in contact with the member 35. The clamps 36 overlap each other, as at 38. It will now be understood that when the member 35 is moved to the right (Fig. 1), the clamps 30 will be raised, and when said member 35 is moved to the left, said clamps 30 may be lowered. In the present instance, use is made of a set screw 39 on one of the sections 10 to retain the member 35 in the adjusted position, and also serves to exert the desired pressure. The core sections 10 are beveled to correspond to the bevel of the rib 27 to thereby insure a proper engagement and a close fit of the parts.

It is to be understood that heat by conduction will reach the core sections 10 from the mold 28, through the mold sections 29 and the clamps 30. If desired, each core section 10 may have a filling plug 40 for the purpose of introducing water into the same, which will be converted to steam to thoroughly distribute the heat.

I claim:

1. The combination of a tire mold core variable as to cross-sectional size, tire bead clamps, bead mold sections within which said clamps may be arranged respectively, and means to apply pressure on said clamps in conjunction with said core and mold sections for shaping the tire beads.

2. The combination of a core consisting of core units connected end to end, each of said units consisting of laterally adjustable sections; and means to cause the simultaneous lateral adjustment of the sections of said units, said means including a rotatable element for operating said means.

3. The combination of a core consisting of core units, means constituting a housing and also a coupling to couple said units together end to end, gearing supported by said housing within the same, each of said units consisting of half sections, and means actuated upon the operation of said gearing, to effect the lateral adjustment of said sections, while arranged within a tire casing, for the purposes specified.

ISAAC W. GLAZNER.